United States Patent
Iacovino, Jr. et al.

(10) Patent No.: US 6,393,086 B1
(45) Date of Patent: May 21, 2002

(54) SPENT NUCLEAR FUEL ASSEMBLY STACKING METHOD

(75) Inventors: John M. Iacovino, Jr., Murrysville; Jeffrey C. Himler, Greensburg, both of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/510,435

(22) Filed: Feb. 21, 2000

Related U.S. Application Data

(60) Provisional application No. 60/122,485, filed on Feb. 26, 1999.

(51) Int. Cl.$^7$ .............................................. G21C 19/00
(52) U.S. Cl. ..................................... 376/272; 250/507.1
(58) Field of Search ................................ 376/272, 260, 376/261; 250/507.1, 506.1

(56) References Cited

U.S. PATENT DOCUMENTS

| | | | | |
|---|---|---|---|---|
| 3,817,398 A | * | 6/1974 | Jones ........................... 212/98 |
| 3,819,066 A | * | 6/1974 | Jones ......................... 214/16 B |
| 3,945,509 A | * | 3/1976 | Weems ....................... 214/16 B |
| 4,010,375 A | * | 3/1977 | Wachter et al. .............. 250/507 |
| 4,029,968 A | | 6/1977 | Rubinstein et al. .......... 250/507 |
| 4,040,480 A | * | 8/1977 | Richards ....................... 166/57 |
| 4,042,828 A | * | 8/1977 | Rubinstein et al. .......... 250/507 |
| 4,069,923 A | * | 1/1978 | Blumeneau et al. ....... 214/17 B |
| 4,072,559 A | * | 2/1978 | Neidl et al. .................... 176/19 |
| 4,124,445 A | * | 11/1978 | Mollon .......................... 176/87 |
| 4,165,255 A | * | 8/1979 | Knight ........................... 176/30 |
| 4,177,385 A | * | 12/1979 | Bevilacqua ................. 250/507 |
| 4,197,467 A | * | 4/1980 | Williams ..................... 250/506 |
| 4,233,518 A | * | 11/1980 | Auyeung et al. ............ 250/507 |
| 4,257,912 A | * | 3/1981 | Fleischer et al. ......... 252/301.1 |
| 4,299,659 A | * | 11/1981 | Hame et al. ................. 376/272 |
| 4,400,344 A | * | 8/1983 | Wachter et al. ............. 376/272 |
| 4,410,802 A | * | 10/1983 | Szulinski ................. 250/515.1 |
| 4,440,718 A | * | 4/1984 | Plagnard ..................... 376/269 |
| RE31,661 E | * | 9/1984 | Mollon .................... 250/507.1 |
| 4,770,844 A | * | 9/1988 | Davis, Jr. .................... 376/272 |
| 4,820,472 A | * | 4/1989 | Machado et al. ........... 376/272 |
| 4,863,638 A | * | 9/1989 | Harper, III .................. 252/633 |
| 4,889,681 A | | 12/1989 | Wachter et al. ............. 376/272 |
| 4,980,119 A | * | 12/1990 | Schoenig, Jr. et al. ...... 376/261 |
| 5,152,958 A | | 10/1992 | Ellingson et al. ........... 376/272 |
| 5,384,813 A | * | 1/1995 | Loftis et al. ................. 376/272 |
| 5,498,825 A | * | 3/1996 | Stahl ............................ 588/16 |
| 5,998,800 A | * | 12/1999 | Geintz et al. ............. 250/506.1 |

* cited by examiner

Primary Examiner—Michael J. Carone
Assistant Examiner—Denise J Buckley

(57) ABSTRACT

Spent nuclear fuel assemblies are stacked in a spent nuclear fuel assembly pool by structurally supporting a second tier nuclear fuel assembly storage rack in the spent nuclear fuel assembly pool over and independently of previously installed first nuclear fuel assembly racks. The spent fuel assemblies then are introduced into the second tier fuel assembly storage racks while vertically oriented.

The spent nuclear fuel assemblies in some spent fuel pools are at least partially raised out of the spent nuclear fuel assembly pool before being introduced into in the storage racks. In zone loading practices, spent nuclear fuel assemblies from the lower tier nuclear fuel assembly racks are at least partially raised out of the pool and then introduced into in the second tier storage racks.

10 Claims, 2 Drawing Sheets

SPENT NUCLEAR FUEL ASSEMBLY STACKING METHOD

CROSS REFERENCE

This invention claims the benefit of Provisional Patent Application No. 60/122,485, filed Feb. 26, 1999.

BACKGROUND OF THE INVENTION

The invention relates to a method for stacking spent nuclear fuel assemblies in a spent fuel pool and more particularly to a method for stacking spent fuel assemblies in two tiers.

Pressurized water nuclear plants and boiling water nuclear plants for commercially generating electricity are refueled on routinely scheduled outages every one to two years. In the course of a refueling outage, a reactor vessel cavity and adjoining refueling canal are submerged in a pool of water and spent nuclear fuel assemblies are removed from a reactor vessel by a refueling machine and transferred by other devices under water to large spent fuel pools connected with the refueling canal by a transfer tube. The removed spent fuel assemblies then are stored in spent fuel storage racks located at the bottom of the spent fuel pool until such time as they can be safely removed from the generating plants to be processed or permanently stored elsewhere. See, e.g., U.S. Pat. Nos. 5,245,641; 4,960,560; 4,900,506; 4,746, 487; 4,400,344; 4,233,518 and 4,010,375.

If remote spent fuel assembly processing facilities and permanent storage facilities can not accept shipments of spent fuel assemblies, the generating plants may need to retain the spent fuel assemblies on site in the spent fuel pools for longer periods of time than was contemplated when the spent fuel pools were designed. Accordingly, the generating plants have had to modify their storage equipment and their storage practices in order to increase the capacities of their spent fuel pools.

In addition, it has been proposed in the industry to stack the spent fuel assemblies in a second tier of spent fuel storage racks over a first tier of spent fuel storage racks. See, e.g., U.S. Pat. Nos. 5,152,958; 4,889,681 and 4,029,968. However, these proposals generally require extensive modifications of the pools or the use of handling equipment which is either not practical or not cost effective.

SUMMARY OF THE INVENTION

It is an object of the present invention to provide an improved method for increasing the number of fuel assemblies that can be stored in existing spent fuel pools. It is a further object to provide a practical method for more readily handling additional spent fuel assemblies in the existing pools.

With these objects in view, the present invention resides in an improved method of stacking spent nuclear fuel assemblies in a spent nuclear fuel assembly pool containing previously installed first nuclear fuel assembly storage racks. In accordance with the invention, a tier of second nuclear fuel assembly storage racks is installed in the spent nuclear fuel assembly pool over and structurally supported independently of structural support members of the previously installed spent nuclear fuel assembly storage racks. One or more vertically oriented spent fuel assemblies are then introduced into the second fuel assembly storage while vertically oriented.

In a preferred practice of the present invention, a spent nuclear fuel assembly is raised at least partially out of the spent nuclear fuel assembly pool before introducing the spent nuclear fuel assembly into the upper tier second nuclear fuel assembly storage racks. In some practices, the spent nuclear fuel assembly been stored in the previously installed first spent nuclear fuel assembly storage rack before transferring it to the upper tier second nuclear fuel assembly storage rack. Advantageously, fuel assemblies that have cooled in a lower tier first storage rack for a number of years may be safely stored in upper tier second nuclear fuel assembly storage racks because they require substantially less shielding. In addition, the nuclear fuel assembly storage racks in the upper tier also absorb radiation emitted by the lower tier first spent nuclear fuel assembly storage racks. This technique of using older, colder spent nuclear fuel assemblies to shield newer, hotter spent nuclear fuel assembly is known in the industry as "zone loading".

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED PRACTICE

Figure 2:
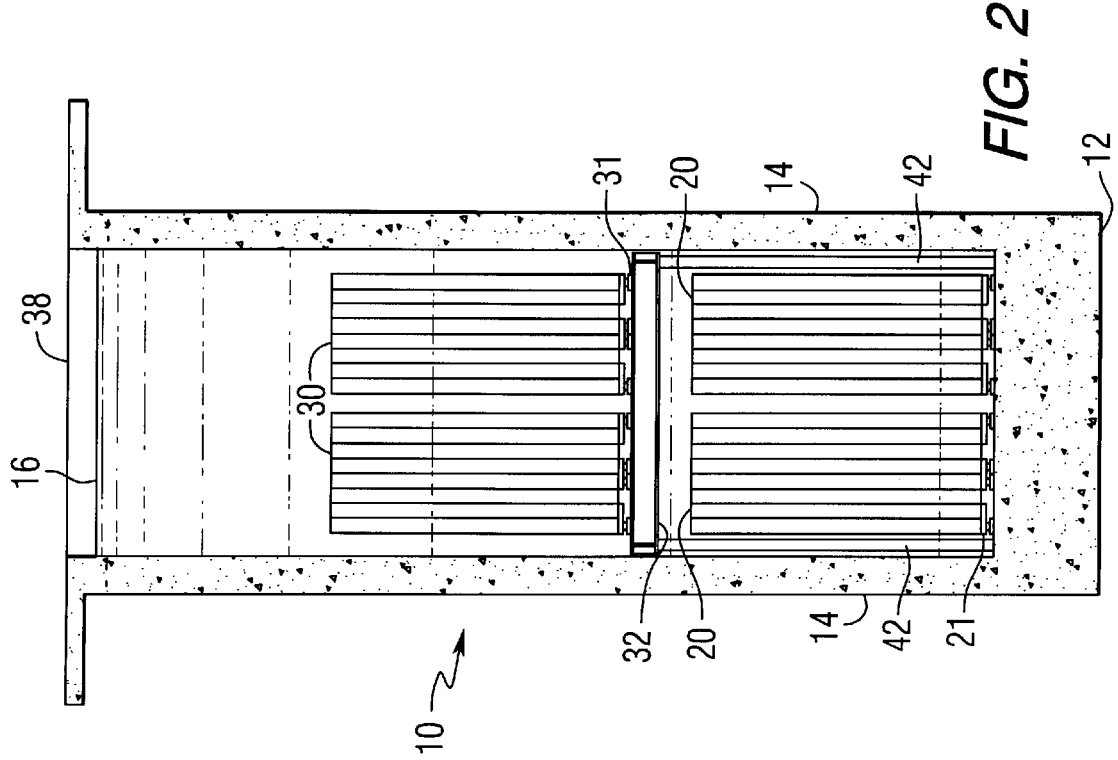
FIG. 2 is a schematic representation of a spent fuel pit with a two tier fuel assembly stacking arrangement wherein the upper storage racks are supported by support posts extending from the floor of the spent fuel pool.
Figure 1:
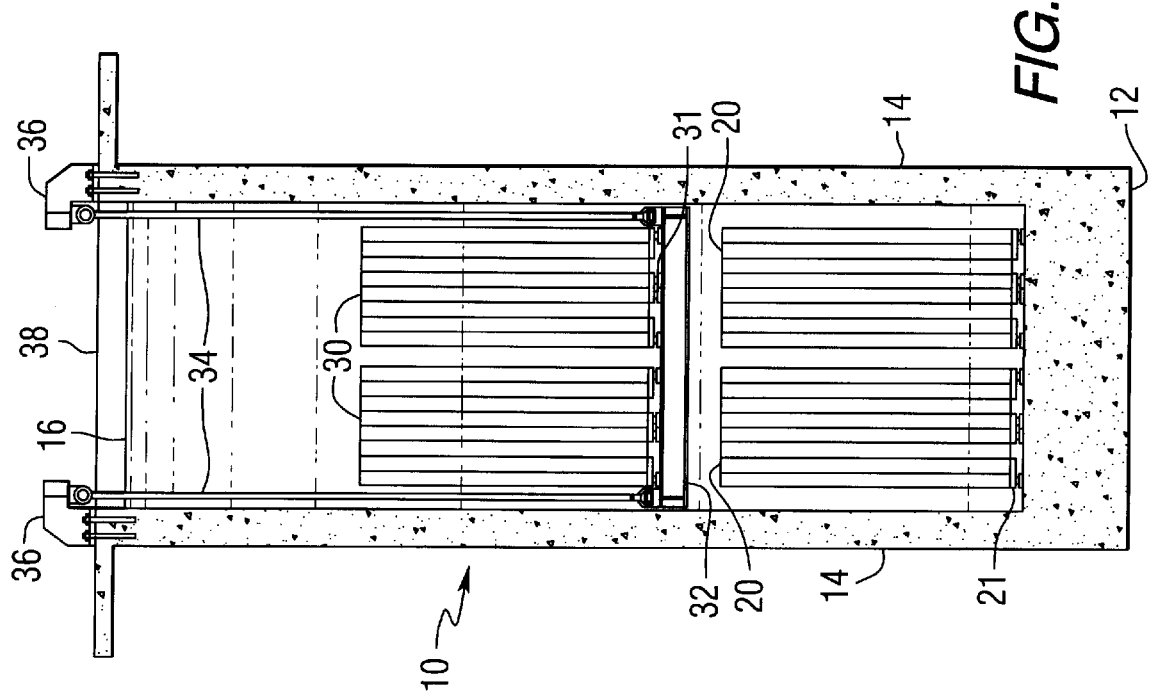
FIG. 1 is a schematic representation of a spent fuel pit with a two tier fuel assembly stacking arrangement wherein the upper storage racks are supported from above the spent fuel pool.

FIGS. 1 and 2 generally depict a spent nuclear fuel assembly pool 10 defined by a floor 12 and sidewalls 14 and containing water up to a water line 16. The pool 10 contains existing first spend nuclear fuel assembly storage racks 20 that are supported by structural members such as support pads 21 on the floor 12 of the pool 10. The storage racks 20 may alternatively be supported via a frame (not shown) that in turn is supported by the floor 12. Floor supported storage systems are discussed in U.S. Pat. No. 5,152,958 and the patents it references, including U.S. Pat. Nos. 4,889,681; 4,666,660; 4,336,103; 4,069,923 and 4,029,968, which patents are incorporated by this reference for their disclosures of the structures of such systems. As is discussed in U.S. Pat. No. 5,152,958 and referenced patents, including U.S. Pat. No. 4,287,426 and West German Patent No. 29 43 455, the spent nuclear fuel assembly storage racks may be wall supported instead of floor supported. These patents are incorporated by this reference for their disclosures of the structures of such systems.

In order to increase the capacity of the spent fuel assembly fuel pools such as pool 10, one or more second spent nuclear fuel assembly storage racks 30 with support pads 31 are installed in the pool 10 over the previously installed racks 20 as shown in FIG. 1. Importantly, the second storage racks 30 are structurally supported independently of the previously installed storage racks 20. Thus, the second storage racks 30 are not directly or indirectly supported by the support pads 21, support frames or other structural support members supporting the previously installed storage racks 20. Advantageously, the second spent nuclear fuel assembly storage racks 30 may be installed while spent nuclear fuel assemblies are being stored in the previously installed racks 20. As shown in FIG. 1, the second storage racks 30 may be supported by a platform 32 suspended from hanger rods 34 extending from hanger brackets 36 bolted or otherwise mounted to the existing operating deck 38 of a spent fuel pool 10. Advantageously, the second storage racks 30 and their structural supports may be designed to support the static load of the second storage racks 30 and the dynamic loads of earthquakes independently of the previously installed storage racks 20.

FIG. 2 shows an alternative two tier storage arrangement where one or more second spent fuel assembly storage racks 30 having support pads 31 are supported on a platform 32. The platform 32 is supported by support members such as floor supported posts 42 that are structurally independent of support pads 21 or other structural members supporting the spent fuel assemblies 20 of the lower tier. The platform 32 may be stationary or, alternatively, may be horizontally mobile (not shown). The previously referenced U.S. Pat. No. 5,152,958 discloses structure of a horizontally mobile spent nuclear fuel assembly storage platform or bridge.

As depicted in FIGS. 1 and 2, the spent nuclear fuel assemblies 30 of the upper tier, like the spent nuclear fuel assemblies 20 of the lower tier, are stored while vertically oriented, i.e., the lengths of the tubes in the assemblies extend vertically. Because fuel assemblies are generally from about eight feet to about fourteen feet in length, the water level 16 of the pool 10 will be no more than about 10 feet above the top of the spent fuel assemblies 30 of the upper tier in many existing spent nuclear fuel assembly pools. This depth is adequate to shield spent fuel rods that are at least about five years old. If additional shielding is desired, then additional shielding (not shown) may be provided over the top of the spent fuel assemblies 30.

In the practice of the present invention, spent nuclear fuel assemblies are introduced into the spent nuclear fuel assembly storage racks 30 while vertically oriented. Accordingly, at least a portion of the spent nuclear fuel assemblies will be raised above the water level 16 in plants where the fuel assemblies are longer than about ten feet in length. In some practices, the spent nuclear fuel assemblies may be entirely raised above the water level 16 of the pool 10.

Figure 3:
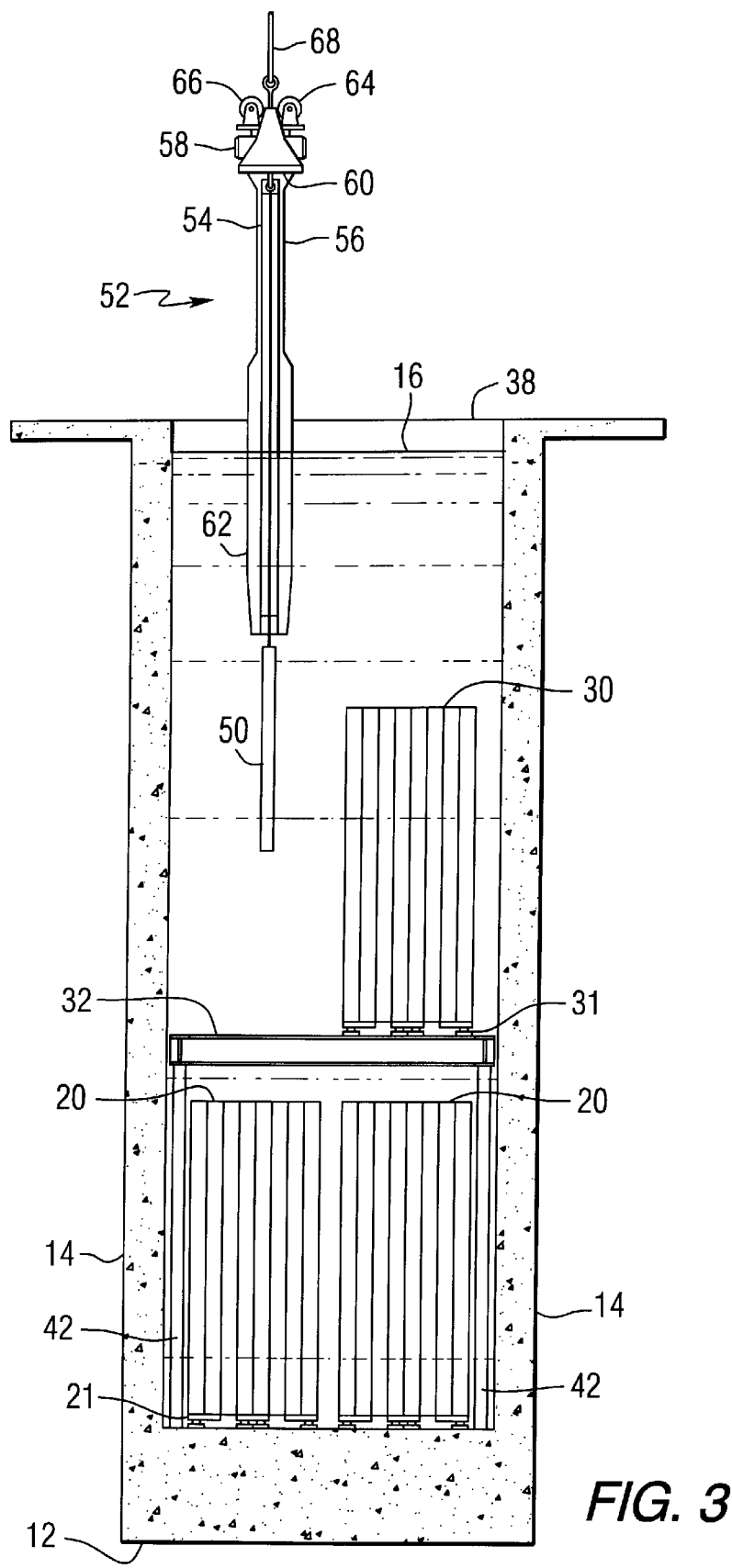
FIG. 3 is a schematic representation of a spent fuel assembly being transferred to or from a storage location in the upper tier.

FIG. 3 depicts a handling assembly 52 in the process of introducing a vertically oriented spent nuclear fuel assembly 50 into an upper tier spent nuclear fuel assembly storage rack 30. The handling assembly 52 may be similar to the design of assemblies carried by refueling machines to introduce fuel assemblies 50 into a reactor pressure vessel (not shown). See, e.g., U.S. Pat. Nos. 4,511,531 and 4,929,413, which show telescoping gripper assemblies carried by refueling machines. Thus, the handling assembly 52 may include a handling tool with air-operated gripper fingers (not shown) disposed in an elongated gripper tube 54 also having an integral shield plug (not shown) disposed above the fingers. The gripper tube 54 may be telescoping operated within a mast 56 by an electric winch 58 to raise and lower the fuel assembly 50 between a position in the storage racks 20 and 30 and a position in a vertically oriented transfer cask 62 mounted on the mast 56. Advantageously, the transfer cask 62 will provide radiation shielding for the spent fuel assembly 50 when near to and above the water surface 18. A support platform 60 supports the gripper tube 54, mast 56, winch 58 and transfer cask 62. The support platform 60 may also support an air hose reel 64 for the handling tool and an electric reel 66 for the electric winch 58. The platform 60 may be suspended over the spent fuel pool 10 via a cable 68 from the generating plant's overhead spent fuel pool crane (not shown).

While a present preferred embodiment of the present invention has been shown and described, it is to be understood that the invention may be otherwise variously embodied within the scope of the following claims of invention.

What is claimed is:

1. A method of stacking spent nuclear fuel assemblies in a spent nuclear fuel assembly pool containing previously installed first nuclear fuel assembly racks, comprising the steps of:

structurally supporting on vertical post, a tier of second spent nuclear fuel assembly storage racks in a spent nuclear fuel assembly pool over and independently of first nuclear fuel assembly rack structural support members;

introducing a vertically oriented spent fuel assembly into a second fuel assembly storage rack while the second fuel assembly storage rack is supported in the spent nuclear fuel assembly pool over and independently of the first nuclear fuel assembly rack structural support members; and then storing the spent fuel assembly in a vertical orientation in the second fuel assembly storage rack.

2. The method of claim 1, including the step of:

raising the spent nuclear fuel assembly at least partially out of the spent nuclear fuel assembly pool before introducing the spent nuclear fuel assembly into the second nuclear fuel assembly storage rack.

3. The method of claim 2, including the step of:

removing the spent nuclear fuel assembly from a first nuclear fuel assembly rack before raising the spent nuclear fuel assembly at least partially out of the pool.

4. The method of claim 2 including the step of:

zone loading the spent nuclear fuel assembly over newer, hotter spent nuclear fuel assemblies.

5. The method of claim 1, including the step of: horizontally moving a platform supporting the second fuel assembly storage racks through the spent nuclear fuel assembly pool.

6. The method of claim 1, including the step of: installing the second fuel assembly storage rack over and independently of the first nuclear fuel assembly rack while spent nuclear fuel assemblies are being stored in the first nuclear fuel assembly rack.

7. The method of claim 1, wherein the step of supporting the second fuel assembly storage rack comprises the step of: supporting the second fuel assembly storage rack from hanger rods from a spent fuel assembly pool operating deck.

8. The method of claim 1, wherein the step of supporting the second fuel assembly storage rack comprises the step of: supporting the second fuel assembly storage rack on spent fuel assembly pool floor posts.

9. The method of claim 2, wherein the step of raising the spent nuclear fuel assembly at least partially out of the spent nuclear fuel assembly pool comprises raising the spent nuclear fuel assembly into a vertically oriented transfer cask.

10. The method of claim 2, wherein the step of raising the spent nuclear fuel assembly at least partially out of the spent nuclear fuel assembly pool comprises raising the spent nuclear fuel assembly into a vertically oriented transfer cask partially extending above the surface of the spent nuclear fuel assembly pool.

* * * * *